United States Patent Office 3,378,562
Patented Apr. 16, 1968

3,378,562
C-CHLORINATION OF SATURATED AMINES
Janos Kollonitsch, Westfield, N.J., assignor to Merck & Co., Inc., Rahway, N.J., a corporation of New Jersey
No Drawing. Filed May 4, 1964, Ser. No. 364,749
13 Claims. (Cl. 260—293)

ABSTRACT OF THE DISCLOSURE

Saturated aliphatic and alicyclic amines containing at least 2 carbon atoms are C-chlorinated by reaction with chlorine in a strongly acidic medium and in the presence of a catalyst. Haloalkyl amines useful as chemical intermediates are obtained.

---

This invention is concerned with the chlorination of saturated amines and the chlorinated products derived therefrom. More particularly, it is concerned with the direct chlorination of saturated amines wherein the saturated aliphatic side chain is chlorinated in preference to the amine substituent.

It is an object of the present invention to provide a process for the preparation of chlorinated amines wherein the chloro substituent is attached to a carbon unsubstituted by amino groups.

Another object is to provide a means of introducing more than one chlorine atom into the aliphatic or alicyclic portion of the saturated amine.

A further object is to provide a method for the simple, direct chlorination of lower aliphatic and lower alicyclic amines, wherein the chlorine atom is directed specifically to certain carbon atoms of the aliphatic chain or ring.

Other objects will become apparent from the detailed description of the invention hereinafter provided.

In accordance with the present invention, it is now found that saturated amine compounds containing at least a two-carbon aliphatic saturated chain can be chlorinated in high yield to the corresponding C-chlorinated derivatives by treatment with chlorine in the presence of a suitable catalyst in a strongly acidic reaction medium. Thus, in accordance with this invention aliphatic amines and alicyclic amines, as well as saturated aliphatic amines unsubstituted except by halogen or alicyclic rings, or salts thereof, can be chlorinated by reacting such compounds with chlorine in a strongly acidic reaction medium. For example, in accordance with this invention, ethylamine, propylamine, diethylamine, triethylamine, 1-chloro-2-(dimethylamino)ethane, cyclorexylamine, cyclopentylamine, piperidine, quinuclidine, α-methylpiperidine, N-methylpiperidine, palmitylamine, stearylamine, neopentylamine, tetrahydrofurfurylamine and tertiary-butylamine, can be chlorinated in accordance with the present process to obtain the corresponding chlorinated derivative.

The process of this invention comprises carrying out the chlorination of the saturated amine compound in a highly acidic reaction medium in the presence of a suitable catalyst. As the acid, there may be employed strong acids such as sulfuric acid, fuming sulfuric acid, chlorosulfonic acid, fluorosulfonic acid, trifluoroacetic acid and mixtures thereof. The acid employed forms salts with the aliphatic amine used and in the instance of use of a salt of an aliphatic amine the salt may either be employed as such or dissolved in one of the above acids. The amount of acid is critical only to the extent that there should be present at least 1 mole of acid per mole of saturated amine compound. Usually the acid is employed as a solvent for the aliphatic amine or salt and, in general, it is desirable to employ larger amounts of the acid than the 1 mole of acid indicated above. In a preferred mode of operation, approximately 2–3 moles of strong acid per mole of aliphatic amine are employed as the reaction medium. Even larger excesses of acid are not harmful in carrying out the process of this invention.

The desired chlorination is preferably effected by treating the saturated amine compound in the acidic reaction mixture with chlorine in the presence of a suitable catalyst. Thus, in accordance with a preferred embodiment of this invention, chlorine gas is passed through the reaction mixture under conditions whereby atomic chlorine is produced in situ in the mixture. This is conveniently accomplished by exposing the reaction mass to a suitable radiation source such as ultraviolet light, fluorescent light, microwaves or X-rays. Alternatively, chemical catalysts known as free radical initiators may be employed. The preferred chemical catalysts are those known in the art as organic azo-type free radical initiator catalysts. These are aliphatic azo compounds which decompose to give free radicals in solution at elevated temperatures. They are generally tertiary alkyl bis-azo-nitriles, carboalkoxy compounds or amides. Examples of such catalysts are α,α-azo-isobutyronitrile, α,α'-azo-bis-isobutyronitrile, dimethyl - α,α' - azo-bis-isobutyrate, α,α'-azo-bis-methyl - butyronitrile, dihexyl - α,α'-azo-bis-isobutyrate, α,α' - azo-bis-isobutyramide, α,α'-azo-bis-cyclopropylpropionitrile, α,α' - azo - bis-isobutylmethylvaleronitrile and α,α' - azo-bis-methylcapronitrile, and water-soluble catalysts of this type such as azo-bis-isobutyroamidinium hydrochloride, and the like. When the chemical free radical initiators are employed, they are used in catalytic amounts and are conveniently added to the reaction mixture while the chlorine gas is being passed into it.

Alternatively, the chlorinating agent may be N-chlorosuccinimide in a strongly acidic medium. The time and temperature conditions of the foregoing described chlorination process are, to some extent, interdependent. Neither of these factors is unduly critical in carrying out the process of this invention. Generally, it is preferred to carry out the chlorination at temperatures within the range of about 75–120° C. although reaction temperatures ranging from about room temperature up to about 160° C. can be utilized. The reaction proceeds somewhat faster at higher temperatures and therefore it is preferred to select operating conditions under which the reaction will be substantially complete in about 2 to 6 hours.

The process of the present invention is valuable in that it makes easily available many chlorinated amines already known by a simple and direct procedure and, in addition, it also makes available chlorinated amines which are extremely valuable intermediates for synthesis in organic chemistry. For example, the 2,2-dichloroethylamine made by the process of this invention is a valuable intermediate in the preparation of new oxazole and thiazole compounds. Likewise, monochloroethylamine and trichloroethylamine previously available by circuitous methods of synthesis are now readily available by the direct chlorination of ethylamine itself.

The following examples are presented to illustrate the methods of carrying out the process of the invention but are illustrative only and should not be deemed to be limiting in any way.

Example 1.—2-chloroethylamine

Eleven and one-fourth grams (0.25) mole of ethylamine gas is absorbed in a mixture made of 22 g. concentrated sulfuric acid and of 22 g. of 20% oleum. Chlorine gas is passed through it under vigorous stirring at 80–85° C. for 5 hours, during which period 1 g. of azo-bis-isobutyronitrile is added, subdivided into 30 equal portions. The weight gain indicates the uptake of 7 g. chlorine. After degassing in vacuo, it is quenched on ice, then poured onto an ion-exchange column made of Dowex 50–X8, a strongly acidic cation exchange resin consisting of sulfonic acid groups contained in a styrene divinyl benzene resin matrix, H+ form. After the sulfuric acid is washed off from the column, the product is eluted with 2 N HCl, the effluent concentrated to dryness in vacuo to give crystalline 2-chloroethylamine hydrochloride. After being recrystallized from isoamyl alcohol-ether it melts at 135° C.

Example 2.—2,2-dichloroethylamine

One hundred three grams of ethylamine (2.28 moles) gas is absorbed in a mixture of 246 g. 98% sulfuric acid and 260 g. of 20% oleum (ice cooling) Then, while irradiated by two 450 w. high-pressure mercury arc lamps (mounted in the focus of paraboloid reflectors) chlorine gas is introduced at 50° C. under vigorous stirring for 90 minutes to form 2,2-dichloroethylamine. The reaction mixture, containing the product, is a clear, viscous oil. The product is extracted from the reaction mixture with ether in the following manner.

It is degassed in vacuo, quenched on ice, over-layered with diethyl ether, then while kept at 0° C., it is made slightly alkaline by the addition of concentrated aqueous ammonia, extracted twice more with ether, the combined ether extracts containing the product are back-washed with a small amount of water, dried over MgSO₄, the ether distilled off in vacuo and the residue comprising 2,2-dichloroethylamine distilled at 1 mm. pressure to give a distillate of 2,2-dichloroethylamine admixed with some ether. Introduction of HCl gas (ice cooling) causes the precipitation of the hydrochloride of 2,2-dichloroethylamine, M.P. 167–168° C. The base 2,2-dichloroethylamine is liberated by adding 2.5 N NaOH to the water solution of the hydrochloride, followed by extraction with ether. The ether is distilled off at atmospheric pressure, then the residue distilled over in vacuo, to give substantially pure 2,2-dichloroethylamine, B.P. 32° C. at 20 mm. Hg.

Example 3.—2,2,2-trichloroethylamine

Ethylamine is chlorinated after it is dissolved in a mixture of concentrated H₂SO₄—20% oleum, the same way as described in Example 2. The only difference is that the chlorination period is longer (3 hours). After degassing, the reaction mixture is poured onto ice, thus causing the separation of the sulfate salt of 2,2,2-trichloroethylamine

$(Cl_3C-CH_2NH_2)_2 \cdot H_2SO_4$ in the form of practically colorless crystals. After recrystallization from water, it has a M.P. of 227–229° C. The mother liquor of the sulfate salt is alkalized by the addition of NH₄OH at about 0° C., extracted by diethyl ether, the extract dried over MgSO₄ and the ether distilled off at atmospheric pressure followed by fractionation in vacuo to give substantially pure 2,2,2-trichloroethylamine. At 20 mm. Hg pressure, the main fraction boils at 42–43° C.

Example 4.—1-chloro-2-(diethylamino)ethane

Fifty and one-half grams (0.5 mole) of triethylamine is added into a mixture of 57 g. of concentrated H₂SO₄ and 36 g. of 20% oleum (ice cooling), and 1.5 g. of PCl₃ is added. Then chlorine is passed through the solution under vigorous stirring at 90–100° C. for 2 hours. Simultaneously, 1 g. of azo-bis-isobutyronitrile is added in 12 equal portions (~0.08 g. in 10 min. intervals). After degassing in vacuo, the reaction mixture containing 1-chloro-2-(diethylamino)ethane is quenched on ice, the pH raised to 8 using an aqueous ammonium hydroxide solution and then the product is extracted by ether. After drying over magnesium sulfate the ether solvent is evaporated and the residue fractionated in vacuo at 22 mm. Hg. At 54–56° C. pure 1-chloro-2-(diethylamino)ethane distills over. For identification, its hydrochloride is prepared, M.P. 204–206° C. Mixed M.P. and I.R. spectrum are identical with that of an authentic sample.

Example 5.—1,1-dichloro-2-(dimethylamino)ethane

Thirty-six grams of 1-chloro-2-(dimethylamino)ethane hydrochloride (0.25 mole) is added into a mixture made of 49 g. of 98% sulfuric acid and 51 g. of 20% oleum. Under release of hydrogen chloride gas the sulfate salt of the starting material is formed. Chlorine gas is passed through this solution under stirring at 80–85° C. for 4 hours; meanwhile 2.4 g. of azo-bis-isobutyronitrile is added into it in 24 portions. The weight gain indicates the uptake of 1 atom chlorine, to form 1,1-dichloro-2-(dimethylamino)ethane. After the solution is degassed and quenched, it is alkalized, extracted with ether, the extract dried over MgSO₄ and the product precipitated as the hydrochloride by the introduction of dry HCl gas. The separated crystallized hydrochloride consists mainly of 1,1-dichloro-2-(dimethylamino)ethane hydrochloride. The crystalline material is dissolved in aqueous ammonium hydroxide to form the free amine which is then extracted with ether and the product obtained as an oil after the evaporation of the ether is fractionated in vacuo. B.P. 65–66° C. (53 m./m.).

Example 6.—1-chloro-2-aminopropane

Fifty-nine grams of isopropylamine (1 mole) is dissolved in a mixture of 100 g. of 98% sulfuric acid and 110 g. of 20% oleum (ice cooling). While being irradiated by two 450 w. mercury arc lamps, chlorine gas is introduced under vigorous stirring for 60 minutes at 70° C. to form 1-chloro-2-aminopropane. After the solution containing the formed product is degassed, it is quenched on ice and the 1-chloro-2-aminopropane thus formed absorbed on an ion exchange column (Dowex–X8 H⁽⁺⁾ form), a strongly acidic cation exchange resin consisting of sulfonic acid groups contained in a styrene divinyl benzene resin matrix. After washing out the sulfuric acid, the product is eluted from the column with 2 N HCl, the eluate concentrated to dryness in vacuo to give a product comprising 1-chloro-2-aminopropane hydrochloride.

Example 7.—1,1-dichloro-2-aminopropane

Twenty-nine and five-tenths grams of isopropylamine (0.5 mole) is dissolved in 150 g. of chlorosulfonic acid (ice cooling) then chlorinated as described in Example 6 with the difference that it is chlorinated for 90 minutes at 55–60° C. After degassing, the solution is quenched on ice and the 1,1-dichloro-2-aminopropane formed absorbed on a resin column made of Dowex–X8 H⁽⁺⁾ form, a strongly acidic cation exchange resin consisting of sulfonic acid groups contained in a styrene divinyl benzene resin matrix. The column is washed free of HCl and H₂SO₄, then the product eluted by 2 N HCl. The eluate is evaporated to dryness in vacuo to give a product comprising 1,1-dichloro-2-aminopropane hydrochloride. The free amine 1,1-dichloro-2-aminopropane can be regenerated from its hydrochloride by neutralization with ammonium hydroxide solution and extraction of the liberated base with ether. The 1,1-dichloro-2-aminopropane is then recovered as a residue by evaporation of the ether in vacuo. M.P. of HCl salt 185° C.

Example 8.—1,1-3,3-tetrachloro-2-aminopropane

Forty-four grams of isopropylamine (0.74 mole) is dissolved in a mixture of 76 g. of 98% sulfuric acid and 80 g. of 20% oleum. The solution thus obtained is chlorinated at 60–65° C. for 3 hours to form 1,1-3,3-tetrachloro-2-aminopropane as the sulfuric acid salt. After the solution is degassed, it is quenched on ice-water, then alkalized with NH₄OH to a pH of 8.5 and the liberated base extracted with diethyl ether. The ether is distilled off in vacuo (90 mm.) and the residue fractionated at 2 mm. of pressure. 1,1-3,3-tetrachloro-2-aminopropane is obtained as colorless oil.

Example 9.—1,1,1-3,3,3-hexachloro-2-aminopropane

Isopropyl amine (40 g.) is dissolved in a mixture of 76 grams of 98% sulfonic acid and 80 grams of 20% oleum. The solution thus obtained is chlorinated at 60–65° C. for about 6 hours by introduction of chlorine gas with vigorous stirring to form 1,1,1-3,3,3-hexachloro-2-aminopropane. The solution containing the product is then degassed and quenched in ice water, after which the solution is made alkaline with aqueous ammonium hydroxide solution to a pH of 8.5 to form the free base 1,1,1-3,3,3-hexachloro-2-aminopropane which is extracted with diethyl ether. The product is recovered as a residue by evaporation of the extract in vacuo at room temperature. The product is then obtained as a colorless oil by fractionation of the resulting residue.

Example 10.—4-chloro-piperidine hydrochloride

Eighty-four grams (1 mole) of piperidine is dissolved in 250 g. (2.5 mole) of fluorosulfonic acid (ice cooling) then chlorinated under ultraviolet irradiation at 40–45° C. for 50 minutes to form a fluoro-sulfonic salt of 4-chloro-piperidine. The reaction mixture is degassed and quenched on ice and neutralized with aqueous ammonium hydroxide to a pH of 8.5, following which the 4-chloro-piperidine is absorbed on Dowex–X2 $H^{(+)}$ form, a strongly acidic cation exchange resin consisting of sulfonic acid groups contained in a styrene divinyl benzene resin matrix. After the excess acid is washed off the column, the base is eluted with 2 N HCl, and the eluate concentrated in vacuo to give a residue consisting substantially of 4-chloro-piperidine hydrochloride.

Example 11.—Tri(2-chloro-ethyl)amine

One hundred one grams of triethylamine (1 mole) is added to a mixture made of 110 g. of 99% sulfuric acid and 105 g. of 20% oleum (ice cooling). Then under vigorous stirring under ultraviolet irradiation, chlorine is passed through this solution at 60–65° C. for 2½ hours. The degassed reaction mixture is quenched on ice-water, then alkalized (pH 8) by adding to it concentrated aqueous ammonia (ice cooling). Extraction with diethyl ether, drying over $MgSO_4$, and evaporation of the ether are followed by fractional distillation in vacuo, to give tri-(2-chloroethyl)-amine, B.P. 98° C. at 2 mm.

Example 12.—4-chloro-quinuclidine

Nine and eight-tenths grams (0.1 mole) of quinuclidine is dissolved in 50 ml. of trifluoroacetic acid. Chlorine is then passed through under rapid stirring under ultraviolet irradiation while the temperature is kept at 35–40° C. After one hour reaction-period the solution is evaporated to dryness in vacuo, the residue dissolved in ice-water, alkalized (pH 8) with concentrated $NH_4OH$ and extracted with diethyl ether. After drying over $MgSO_4$ the solvent is evaporated at atmospheric pressure and the residue fractionated in vacuo (75 mm. Hg) to give 4-chloro-quinuclidine.

Various changes and modifications of the invention can be made, and to the extent that such variations incorporate the spirit of this invention, they are intended to be included with the scope of the appended claims.

What is claimed is:
1. 2,2-dichloroethyl amine.
2. 1,1-dichloro-2-(dimethylamino)ethane.
3. 1,1-dichloro-2-aminopropane.
4. 1,1-3,3-tetrachloro-2-aminopropane.
5. The process for producing C-chlorinated derivatives of saturated amines which comprises intimately contacting an amine having a saturated aliphatic chain containing at least two carbon atoms with chlorine at a temperature of between room temperature and about 160° C., in the presence of a free radical initiating catalyst and in the presence of a strongly acidic reaction medium containing at least one mole of strong acid per mole of amine wherein the acid is selected from the group consisting of sulfuric acid, fuming sulfuric acid, chlorosulfonic acid, fluorosulfonic acid and trifluoroacetic acid.
6. The process of claim 5 wherein the saturated amine is a primary aliphatic amine.
7. The process of claim 5 wherein the saturated amine is an alicyclic amine.
8. The process of claim 5 wherein the saturated amine is ethylamine.
9. The process of claim 5 wherein the saturated amine compound is triethylamine.
10. The process of claim 5 wherein the saturated amine is 1-chloro-2-(dimethylamino)ethane.
11. The process of claim 5 wherein the saturated amine compound is isopropylamine.
12. The process of claim 5 wherein the saturated amine is piperidine.
13. The process of claim 5 wherein the saturated amine is quinuclidine.

References Cited

UNITED STATES PATENTS 2,443,385   6/1948   Hardman _____ 260—583
3,146,268   8/1964   Jenny _____ 260—583

OTHER REFERENCES

Vykydal et al.: Chemical Abstracts, vol. 51, page 5308i (4-1957).

CHARLES B. PARKER, Primary Examiner.

R. L. RAYMOND, Assistant Examiner.